United States Patent

Haskell et al.

[15] 3,676,516
[45] July 11, 1972

[54] PURIFICATION OF ETHYLENE OR PROPYLENE STREAMS CONTAINING CARBON MONOXIDE

[72] Inventors: Donald M. Haskell; Bradley L. Munro, both of Bartlesville, Okla.

[73] Assignee: Phillips Petroleum Company

[22] Filed: May 18, 1970

[21] Appl. No.: 38,524

[52] U.S. Cl. .............................260/677 A, 23/2, 252/476
[51] Int. Cl. ......................................................C07c 11/12
[58] Field of Search ..................260/677 A; 252/476; 23/2 S

[56] References Cited

UNITED STATES PATENTS

| | | | |
|---|---|---|---|
| 3,545,915 | 12/1970 | Lutchko et al. | 23/2 S |
| 3,576,596 | 4/1971 | Krane et al. | 23/2 S |
| 3,549,719 | 12/1970 | Duyverman et al. | 260/677 |
| 3,261,723 | 3/1962 | Hirschbeck et al. | 23/2 |
| 3,380,800 | 3/1968 | Marten | 23/2 |
| 2,204,501 | 6/1940 | Krauss | 23/2 |
| 3,295,918 | 1/1967 | Briggs et al. | 23/2 |
| 2,775,637 | 12/1956 | Lanning et al. | 260/683.15 |

FOREIGN PATENTS OR APPLICATIONS

| | | | |
|---|---|---|---|
| 555,597 | 8/1943 | Great Britain | 260/677 |

*Primary Examiner*—Delbert E. Gantz
*Assistant Examiner*—J. M. Nielson
*Attorney*—Young and Quigg

[57] ABSTRACT

A propylene or ethylene stream containing small quantities of carbon monoxide is contacted with a supported copper oxide catalyst wherein 20 to 95 weight percent of the copper is in the cupric state and the remainder is in a lower valence state. The catalyst is advantageously prepared by treating an oxidized copper oxide catalyst with carbon monoxide or hydrogen.

11 Claims, No Drawings

PURIFICATION OF ETHYLENE OR PROPYLENE STREAMS CONTAINING CARBON MONOXIDE

This invention relates to the purification of propylene or ethylene streams containing small quantities of carbon monoxide.

Carbon monoxide has a serious poisoning effect upon many catalysts utilized for the polymerization of ethylene or propylene. To prevent this, the carbon monoxide content of the olefin must be reduced to 0.2 part per million or lower.

Supported copper catalysts have been proposed for the removal of carbon monoxide from various gases other than polymerization-grade olefins. In such processes, the copper is present entirely in the cupric of cuprous state and the temperature for carbon monoxide removal is generally 390° F. and higher.

We have discovered that copper oxide catalysts supported on talc or alumina can be utilized to efficiently remove very small quantities of carbon monoxide from polymerization-grade ethylene or propylene streams. According to our invention, the catalyst is treated so that 20 to 95 percent of the active copper is in the cupric state. The rest of the copper is predominantly in the cuprous state although small quantities may be reduced to the metallic state. Surprisingly, the efficiency of such a catalyst for carbon monoxide removal is substantially greater than that of a copper oxide catalyst wherein the copper is entirely in the cupric state or entirely in the cuprous state. It is a feature of the invention that the purification can be carried out at temperatures substantially lower than 390° F.

Catalysts in all three states were tested to determine the "break-through" loading of carbon monoxide when treating an ethylene or propylene stream containing small quantities of this contaminant. We define the "break-through" loading as the loading in cubic feet of carbon monoxide per pound of catalyst when carbon monoxide is first detected in the effluent from the catalytic treatment. For this purpose, the effluent was analyzed by chromatographic apparatus capable of detecting 0.2 part per million of carbon monoxide in the effluent stream. Runs were made with various amounts of carbon monoxide, ranging from 1 to 15 parts per million, and the "break-through" loading calculated in each instance. The "break-through" loading values can be readily expressed in terms of equivalent days of operation utilizing a feed containing 1 part per million of carbon monoxide. This is about the amount normally present in the ethylene or propylene stream to be purified.

Although the described catalyst can be prepared by the oxidation of a reduced supported copper oxide catalyst, we have found that outstanding results are attained where the supported copper oxide catalyst is first oxidized and then treated with a stream of carbon monoxide or hydrogen at specified temperatures, times and gas hourly space velocities.

Broadly speaking, this reduction treatment can be carried out by employing a stream containing 1 to 10 percent by volume of hydrogen or carbon monoxide in nitrogen, at a temperature of 200° to 500° F. and a gas hourly space velocity of 100 to 1,000 for a period of 5 to 120 minutes. More advantageously, the treatment is carried out in a more restricted range wherein the reducing gas is 1 to 5 volume percent of hydrogen in nitrogen, the temperature is 250° to 350° F., the space velocity is 250 to 750 and the treatment is carried out for 20 to 60 minutes. Suitable conditions for treating the ethylene or propylene with the thus-prepared copper oxide catalyst are a temperature of 110° to 250° F., a gas hourly space velocity of 1,000 to 5,000 and a pressure of 100 to 1,000 pounds per square inch gauge.

The catalysts of the invention contain 5 to 80 weight percent copper, although the amount of copper is not critical. One suitable class of catalysts contain 20 to 40 weight percent copper and are promoted with barium and chromium compounds.

The following examples illustrate the advantages of our invention in removing small amounts of carbon monoxide from an ethylene stream.

EXAMPLE I

Ethylene streams containing a few parts per million of carbon monoxide were contacted with a copper oxide on alumina catalyst containing 9.2 percent copper. Such catalysts typically contain 5 to 12 weight percent copper. The alumina support contained boehmite, i.e., alumina monohydrate together with alumina in the gamma form. The following data were obtained utilizing 1.5 to 3 parts per million carbon monoxide in the ethylene feed with the catalyst in various states of oxidation. All runs were made at a temperature of 200° F. and a gas hourly space velocity of 2,300.

| Run No. | Catalyst Type | Parts per Million Carbon Monoxide in Feed | Break-through Loading Cubic Feet Carbon Monoxide per lb. Catalyst | Equivalent days operation |
|---|---|---|---|---|
| 1 | Oxidized | 2.7 | 0.0061 | 6.6 |
| 2 | Invention | 2.24 | 0.0264 | 28.6 |
| 3 | Invention | 1.5 | 0.0274 | 29.7 |
| 4 | Invention | 3.0 | 0.0446 | 48.3 |
| 5 | Reduced | 2.6 | <0.0074 | <8.0 |

In Run No. 1, the catalyst was oxidized at a temperature of 257° to 285° F. and a gas hourly space velocity of 1,550. In Run No. 2, the oxidized catalyst of Run No. 1 was treated for 24 minutes with a stream of 5 percent by volume hydrogen in nitrogen at a temperature of 300° to 350° F. and a gas hourly space velocity of 690. In Run No. 3, the catalyst was oxidized at 300° to 370° F. and then treated with a 5 percent by volume stream of hydrogen in nitrogen for 24 minutes at a temperature of 300° to 360° F. and a gas hourly space velocity of 690. In Run No. 4, the catalyst was oxidized at 200° to 400° F. and then treated for 30 minutes with a stream of 5 percent by volume hydrogen in nitrogen at a temperature of 300° to 320° F. and a gas hourly space velocity of 276. In Run No. 5, the catalyst was oxidized at a temperature of 300° to 430° F. and then treated with a stream containing 5 percent by volume of hydrogen in nitrogen for 4 hours, 45 minutes at a gas hourly space velocity of 276.

As a result of this treatment, the catalyst of Run 1 was completely oxidized to the cupric state while in Run No. 5 the copper was substantially all in the cuprous or lower state. In Runs No. 2 and 3 the active portion of the copper catalyst was about 20 percent cupric and 80 percent cuprous while in Run No. 4 the copper was approximately 75 percent cupric and 25 percent cuprous.

The data show that the break-through loading for the partially reduced catalysts of the invention was several times that of the fully reduced or fully oxidized catalyst. Further, when translated into equivalent days of operation before break-through, the period of operation was several times longer for the catalysts of the invention than for the fully oxidized or reduced catalyst.

The following runs illustrate operations at higher carbon monoxide loadings in the range of 13 to 15 parts per million carbon monoxide in the ethylene feed. The catalysts of Runs 6, 7, 8 and 9 were treated similarly to those of Runs 2, 3, 4 and 5, respectively, prior to contacting of the ethylene stream therewith.

| Run No. | Catalyst Type | Parts per Million Carbon Monoxide in Feed | Break-through Loading Cubic Feet Carbon Monoxide per lb. Catalyst | Equivalent Days operation |
|---|---|---|---|---|
| 6 | Invention | 13.4 | 0.0108 | 11.7 |
| 7 | Invention | 14.0 | 0.0070 | 7.6 |
| 8 | Invention | 14.5 | 0.0397 | 43.0 |
| 9 | Reduced | 13.3 | Immediate | 0 |

The results show that a substantial loading of the catalyst of the invention was obtained before break-through whereas break-through was immediate with the fully reduced catalyst.

EXAMPLE II

An ethylene stream containing small quantities of carbon monoxide was treated with a copper oxide catalyst supported on talc ($Mg_3Si_4O_{11} \cdot H_2O$). The catalyst contained 33 percent copper together with about 1.5 weight percent each of barium and chromium (measured as the oxide). The catalyst was in the form of cylindrical pellets 4 millimeters in diameter and 3 to 4 millimeters long. It had a bulk density of about 800 grams per liter and a crushing strength of about 200 kilograms per square centimeter.

Due to the pelleted nature of the catalyst, it is believed that the surface copper was mostly affected by the oxidation and reduction treatments hereinafter described. That is, these treatments may not have affected the copper near the center of the pellet which did not participate substantially in the ethylene purification reaction. All the runs were made at a temperature of 200° F. The results were as follows:

| Run No. | Catalyst Type | Gas Hourly Space Velocity | parts per Million Carbon Monoxide in Feed | Break-through Loading Cubic ft. Carbon Monoxide per lb. catalyst | Equivalent days |
|---|---|---|---|---|---|
| 10 | Oxidized | 2350 | 1.0 | 0 | 0 |
| 11 | Invention | 2700 | 1.1 | >0.125 | >112 |
| 12 | Reduced, then oxidized | 2350 | 1.0 | 0.0003 | <1 |
| 13 | Oxidized | 2465 | 1.6 | <0.069 | <62 |
| 14 | Invention | 2700 | | >0.140 | >125 |

In Run No. 10 the catalyst was air oxidized at 250° to 300° F. for 6 hours at a gas hourly space velocity of 1,600 so that substantially all of the copper was in the cupric state. In Run 11, made according to the invention, the catalyst was air oxidized at 225° to 400° F. at a gas hourly space velocity of 276 and then partially reduced by treatment with a 3 percent by volume stream of hydrogen in nitrogen at a temperature of 225° to 245° F. for 30 minutes at a gas hourly space velocity of 276 whereby approximately 92 percent of the active copper was in the cupric state while the remainder was in the cuprous or lower state. In Run No. 12, the catalyst was reduced with a stream which was gradually increased in hydrogen content from 2 volume percent in nitrogen to 100 percent hydrogen over a period of 7 hours and then an additional 12 hours of 100 percent hydrogen at a temperature of 270° to 321° F. and a gas hourly space velocity of 527. This was followed by air oxidation at 245° to 355° F. and a gas hourly space velocity of 1,580 for a period sufficient to fully oxidize the copper.

The data show that the catalyst of the invention provided a substantial break-through loading before carbon monoxide appeared in the ethylene effluent stream and gave a substantial number of equivalent days of operation whereas the oxidized catalyst gave practically immediate break-through with 1 or less equivalent days of operation.

In Run 13 the catalyst was oxidized with air at a temperature of 250° to 300° F. for a period sufficient to substantially completely oxidize the copper to the cupric state whereas in Run 14, according to the invention, the oxidized catalyst was reduced with a stream containing 3 volume percent hydrogen in nitrogen at a temperature of 260° to 305° F. for a period of 30 minutes and a gas hourly space velocity of 276, thus producing a catalyst in which about 92 percent of the active copper was in the cupric state, the remainder being in the cuprous or lower state. Here, the results utilizing the partially reduced catalyst of the invention were more than twice as good, expressed in terms of break-through loading or equivalent days of operation, as the oxidized catalyst.

In the foregoing runs, the ethylene stream containing the specified quantities of carbon monoxide was contacted with the catalyst at a temperature of 200° F., and a gas hourly space velocity range of 2,350 to 2,700.

It will be apparent that we have achieved the objects of our invention in providing a catalyst substantially superior to those heretofore known for removing small quantities of carbon monoxide from an ethylene or propylene stream at a temperature lower than heretofore employed.

We claim:

1. A method of removing carbon monoxide from a stream containing a hydrocarbon selected from the group consisting of ethylene and propylene which comprises passing said stream in the gas phase into contact with a catalyst comprising copper oxide supported on alumina or talc, 20 to 90 weight percent of the copper of said copper oxide being in the cupric state, said catalyst being promoted with barium and chromium compounds.

2. The method of claim 1 in which said catalyst contains 20 to 40 weight percent copper.

3. The method of claim 1 in which said catalyst contains about 1.5 weight percent barium and about 1.5 weight percent chromium.

4. The method of claim 3 in which said catalyst contains about 33 weight percent copper.

5. The method of claim 1 in which said catalyst is prepared by contacting said copper oxide with a stream containing 1 to 10 percent by volume of hydrogen or carbon monoxide in nitrogen at a temperature within the range of about 200° to about 500° F. and a gas hourly space velocity within the range of 100 to 1,000 for 120 minutes.

6. The method of claim 1 in which said catalyst is prepared by treating said copper oxide with a stream containing 1 to 5 percent by volume of hydrogen in nitrogen at a temperature within the range of about 300° to about 350° F. and a gas hourly space velocity within the range of about 250 to 750 for 20 to 35 minutes.

7. The method of removing carbon monoxide from a stream containing a hydrocarbon selected from the group consisting of ethylene and propylene which comprises passing said stream in the gas phase into contact with a catalyst consisting essentially of copper oxide supported on alumina or talc, 20 to 95 weight percent of the copper of said copper oxide being in the cupric state.

8. The method of claim 7 in which said catalyst contains 5 to 80 percent by weight of copper and said stream contains ethylene.

9. The method of claim 7 in which said catalyst contains 20 to 40 weight percent copper.

10. The method of claim 5 in which said catalyst is prepared by treating said copper oxide with a stream containing 1 to 10 percent by volume of hydrogen or carbon monoxide in nitrogen at a temperature within the range of about 200° to about 500° F. and a gas hourly space velocity within the range of 100 to 1,000 for 5 to 120 minutes.

11. The method of claim 4 in which said catalyst is prepared by treating said copper oxide with a stream containing 1 to 5 percent by volume of hydrogen in nitrogen at a temperature within the range of about 300° to about 350° F. and a gas hourly space velocity within the range of about 250 to 750 for 20 to 35 minutes.

* * * * *